United States Patent [19]

Gardner et al.

[11] Patent Number: 4,503,675
[45] Date of Patent: Mar. 12, 1985

[54] FAIL-SAFE ACTUATOR WITH FUSIBLE LINK

[75] Inventors: John F. Gardner, Loveland; Thomas W. Showalter, Milford, both of Ohio

[73] Assignee: Xomox Corporation, Cincinnati, OhioIO

[21] Appl. No.: 352,542

[22] Filed: Feb. 26, 1982

[51] Int. Cl.³ .............................................. F16K 17/40
[52] U.S. Cl. ........................................ 60/527; 137/72; 169/40; 169/38; 251/66
[58] Field of Search ............... 60/527; 251/66; 137/72, 137/75, 79; 169/37, 38, 39, 40, 90

[56] References Cited

U.S. PATENT DOCUMENTS

| | | | |
|---|---|---|---|
| 1,891,183 | 12/1932 | Rowley | 169/40 |
| 2,860,649 | 11/1958 | Billian | 137/75 |
| 2,962,035 | 11/1960 | Wright et al. | 137/75 X |
| 3,378,021 | 4/1968 | Milo | 137/75 X |
| 3,726,299 | 4/1973 | Wheatley, Jr. | 137/75 |
| 3,896,835 | 7/1975 | Wicke | 137/72 X |
| 4,275,754 | 6/1981 | Lyons et al. | 137/75 |

FOREIGN PATENT DOCUMENTS 1600668 1/1967 Fed. Rep. of Germany .
2449678 10/1974 Fed. Rep. of Germany .

*Primary Examiner*—Allen M. Ostrager
*Attorney, Agent, or Firm*—Kinney and Schenk

[57] ABSTRACT

An apparatus for moving a controlled member, as for example a valve, to a predetermined position in response to temperature conditions includes a bearing member which overcomes a force exerted by an energy storage device within a predetermined temperature range. The bearing member includes a fusible material which melts in another predetermined temperature range to enable the force exerted by the energy storage device to overcome the bearing member and to move the controlled member to a fail-safe position.

25 Claims, 10 Drawing Figures

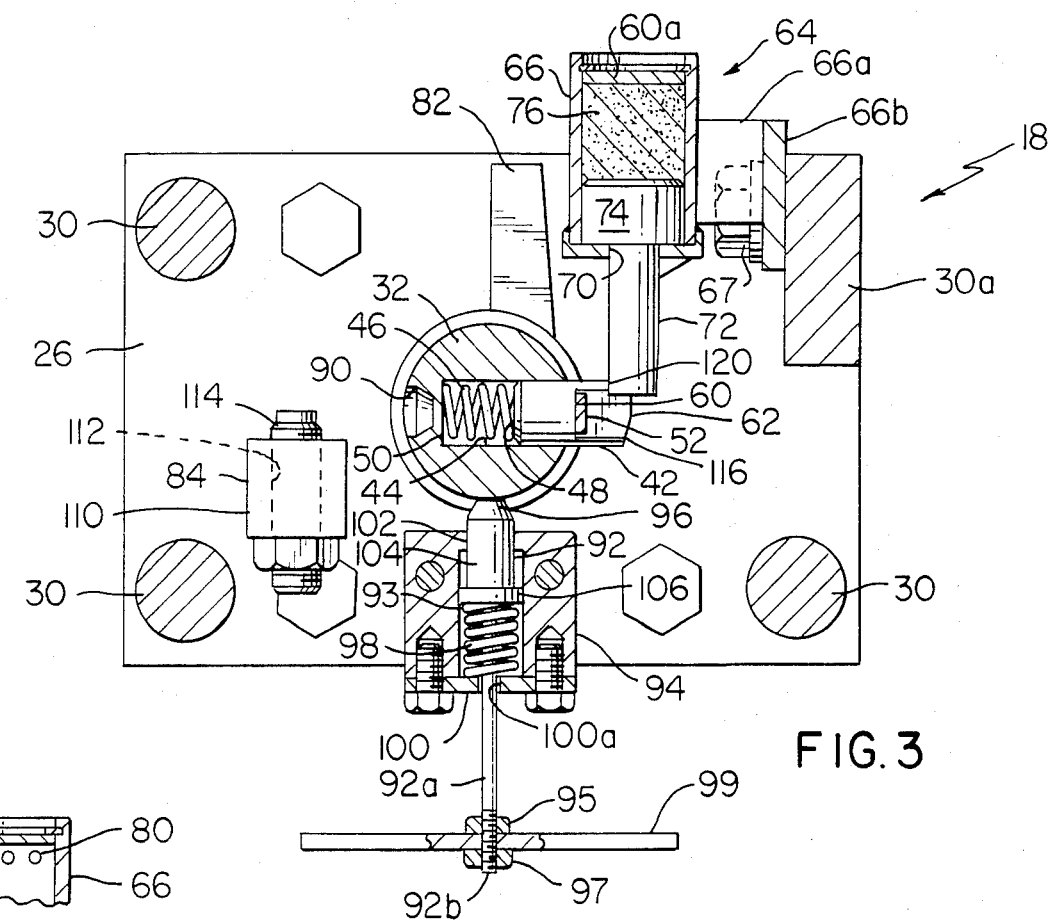
FIG. 3
FIG. 3A
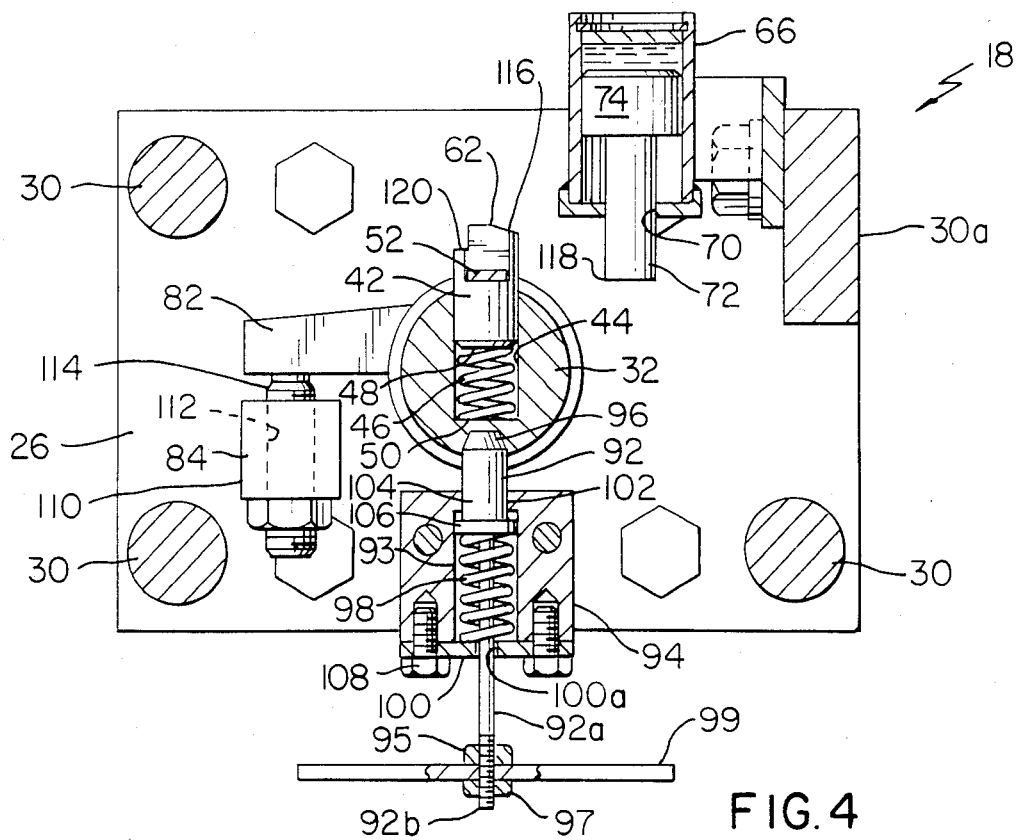
FIG. 4

FAIL-SAFE ACTUATOR WITH FUSIBLE LINK

BACKGROUND OF THE INVENTION

The present invention relates generally to actuator mechanisms and more particularly concerns an actuator mechanism which will move a controlled member to a predetermined position in response to predetermined conditions. The invention will be described by way of example, in connection with a mechanism with a fusible or meltable link that rotates a valving member to a fail-safe position in response to a fire or other ultra high temperature conditions.

Many industrial facilities have controlled mechanisms that must be moved to a predetermined position upon the occurrence of certain contingencies. One such example would be a valve in a hydrocarbon process line. Since the hydrocarbon media in the process line controlled by such a valve is flammable, it may be highly desirable to move the valve to a closed position in order to terminate the hydrocarbon flow in the event of a fire. In such a situation, the failure to move the valve may result in feeding the fire and compounding any resulting dangers and damages.

Conversely, the line may contain a fire extinguishing agent, the flow of which would be highly desirable under fire conditions. The preferred position for a valve controlling such a media would be in an open position, a position which would allow discharge of the fire repellant and serve to extinguish the fire.

Unfortunately, fire and other ultra high temperature conditions often destroy valve actuating mechanisms and controls therefore. Alternately, the valve may be manually operated and inaccessible in case of fire. Consequently, it is possible that a particular valve or other type of mechanism will be in an undesirable position in a fire situation and an operator will be unable to control the valve to move it to the more desirable position.

In order to overcome the problem described above, certain "fail-safe" actuators have been developed to return a valve member to its preferred position in response to certain conditions. One such example is disclosed in U.S. Pat. No. 4,275,642. In that patent, a disparity in exhaust air flow resistances on opposite sides of an air actuated vane type actuator causes a valve to move to a preferred position in the event of a sudden drop in air pressure.

The present invention, in its preferred form, is responsive to temperature to move a valve or other controlled device to a preferred position in the event of a fire. A fusible material which will melt under fire conditions is used to support a load induced by a stored energy device. When the fusible material is melted under high temperature conditions, the fusible material will no longer support the load induced by the stored energy device, and the stored energy in that device is used to move the controlled device to its preferred position.

It is therefore an object of the present invention to provide an actuator that will move a controlled mechanism to a predetermined position in response to high temperature conditions.

It is another object of the present invention to provide an actuator which will store energy and release that stored energy in response to high temperature conditions.

It is yet another object of the present invention to provide an actuator which will hold a controlled mechanism in a predetermined position after having moved the controlled mechanism to that predetermined position.

It is still another object of the present invention to provide an actuator that will move a controlled member to a predetermined position that may be adjusted.

SUMMARY OF THE INVENTION

In accordance with the invention, an apparatus is provided for moving a controlled member to a predetermined position in response to high temperature conditions. This apparatus includes an energy storage device and a movable actuating member. The actuating member is urged to a predetermined position by the energy storage device. A bearing member having at least a portion formed of a fusible material with a melting temperature substantially less than the melting temperature of the actuating member is selectively engageable with the actuating member and operative to prevent movement thereof when the actuating member is under the urging of the energy storage device when the fusible material is in an unmelted condition. A stop member is provided for limiting movement of the actuating member after the fusible material is in a meltable condition and the actuator member has moved under the biasing force of the energy storage device. A controlled member is also connected to the actuating member and movable therewith. This controlled member is movable from a first position corresponding to the actuating member's engagement with the bearing member to a second position corresponding to the actuated member's engagement with the stop member.

In accordance to a further aspect of the invention, the bearing member includes a piston cylinder arrangement with the fusible material being disposed within the cylinder to limit movement of the piston within the cylinder under predetermined temperature conditions. The fusible material is meltable under certain other temperature conditions to allow movement of the piston within the cylinder.

In accordance with another aspect of the invention, the actuating member is rotatably movable with respect to the bearing member.

In a still further aspect of the invention, the actuating member includes latching means for selectively engaging the bearing member when the fusible material is in an unmelted condition.

In accordance with a still further aspect of the invention, the actuating member includes a cylindrically shaped portion with a peripheral surface and the latching means is resiliently biased radially beyond the peripheral surface.

Yet another aspect of the invention includes a stop arm extending radially outward from the cylindrically shaped portion of the actuating member with the stop arm being selectively engageable with the stop member for limiting movement of the actuating member after the fusible material is in a melted condition.

According to a further aspect of the invention, the stop member is adjustable to vary the limiting position of the stop arm.

In yet another aspect of the invention, means are provided for selectively locking the actuating member in the second position which corresponds to the actuating member's engagement with the stop member.

In another aspect of the invention, the locking means includes a recess in the actuating member and a cooperating locking pin which is selectively insertable into the recess to limit rotation of the actuating member.

According to a further aspect of the invention, the locking pin is spring biased into engagement with the peripheral surface of the cylindrically shaped portion of the actuating member so as to move into the recess when the recess and locking pin are brought into registry.

In a further aspect of the invention, the latching means includes a latch pin reciprocally movable within a bore, the bore extending radially into the cylindrical portion of the actuating member.

In another aspect of the invention, the latch pin has a lead in angle on its end portion with the end portion being obliquely oriented with respect to the piston when the actuating member is engaged with the bearing member.

In accordance to a further aspect of the invention, a piston rod is affixed to the piston with the piston rod being positioned in the rotational path of the latch pin when the fusible material is in the unmelted condition and the piston rod being movable out of the latch pin's rotational path after melting of the fusible material.

In accordance with another aspect of the invention, the latch pin has a shoulder on one of the sides, which shoulder is adapted to engage the piston rod.

In accordance to a still further aspect of the invention, an apparatus is provided for moving a valve to a predetermined position in response to high temperature conditions. The apparatus includes an energy storage device and a rotatable member. The rotatable member is urged to a predetermined position by the energy storage device. A bearing member having at least a portion formed of a fusible material with a melting temperature substantially less than the melting temperature of the rotating member is also provided. This bearing member is selectively engageable with a rotatable member and operative to prevent movement of the rotatable member under the urging of the energy storage device when the fusible material is in an unmelted condition. A stop member is also provided for limiting rotation of the rotatable member after movement from the bearing member after the fusible material is in a meltable condition. A valve is connected to the actuating member and movable therewith. This valve is movable between a first position corresponding to the rotatable member's engagement with the bearing member to a second position corresponding to the actuating member's engagement with the stop member.

BRIEF DESCRIPTION OF THE DRAWINGS

Other objects and advantages of the invention will become apparent upon reading the following detailed description and upon reference to the drawings, in which:

FIG. 3 is a cross sectional view of the actuator of FIGS. 1 and 2 taken along line 3—3 in FIG. 2 depicting the actuator in an energy storage position prior to melting of the fusible portion of its bearing member.

FIG. 3a is a fragmentary bottom of a cylinder shown in FIG. 3 depicting a plurality of apertures in bottom of the cylinder wall.

FIG. 4 is a cross sectional view of the actuator of FIGS. 1-3 also taken along line 3—3 in FIG. 2, but showing the actuator in a fail-safe locked position after the fusible portion of the bearing member has melted.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE PREFERRED EMBODIMENTS

Figure 1:
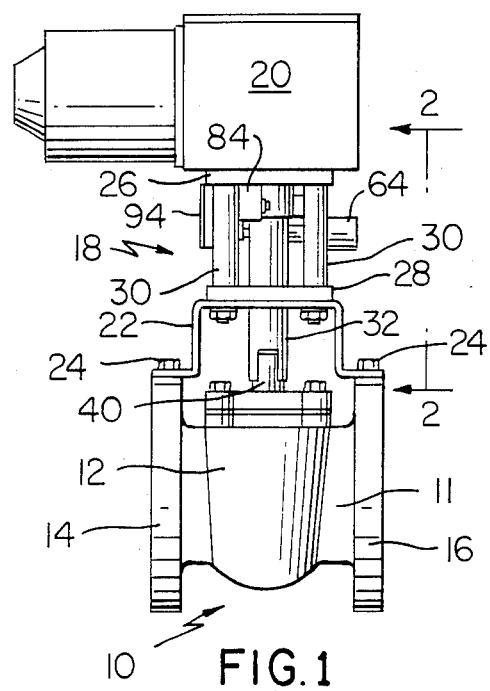
FIG. 1 is an elevational view showing a first preferred embodiment of the actuator of the present invention mounted atop a plug valve.

Referring now to the drawings, FIG. 1 shows a plug valve generally designated by the numeral 10 which includes a body 11 with a tapered cylindrical bore portion 12 positioned between a pair of flanges 14 and 16. Flanges 14 and 16 are adapted, as is usual in the art, for mating with complimentary flanges (not shown) of pipe sections.

Mounted atop the valve body 11 is an actuator mechanism generally designated by the numeral 18. The actuator mechanism 18 supports an energy storage device 20, which device 20 is in operative relationship with the valve 10 through the actuator mechanism 18. As will be apparent from the following description of the preferred embodiments and explained more fully below, the energy storage device 20 may be one of several various types which are known, or will be known, to those skilled in the art. In applicant's illustrated embodiment, however, the energy storage device takes the form of a commercially available cam spring return actuator sold by Matryx Company of Cincinnati, Ohio, U.S.A. Moreover, such a spring return actuator is described in U.S. Pat. No. 4,248,104.

Figure 2:
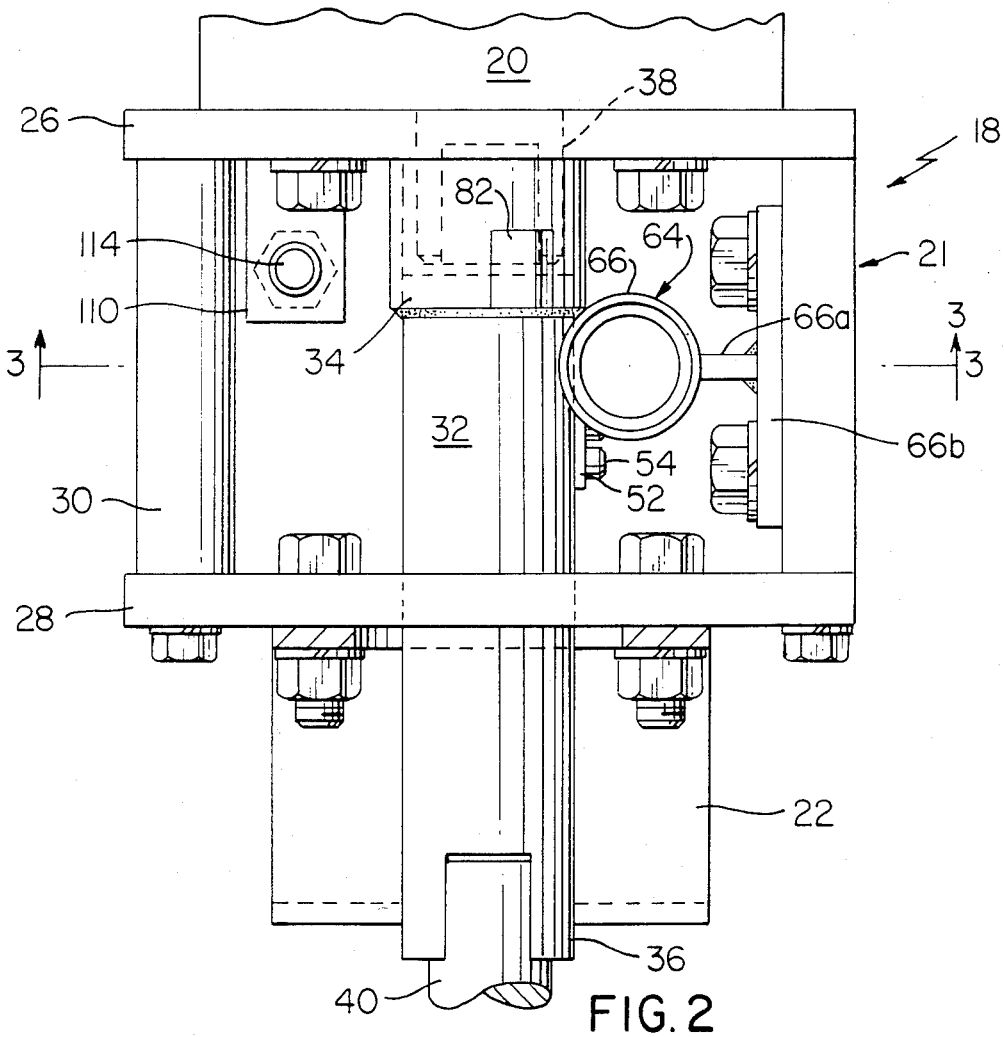
FIG. 2 is a view of the actuator of FIG. 1 in the direction of line 2—2 of FIG. 1.

FIG. 2 shows the actuator mechanism 18 of the present invention in greater detail. It is seen that the actuator mechanism 18 includes a base 21 which is supported by a bracket 22. The bracket 22 is in turn secured to the top of the valve body 11 through the agency of a plurality of bolts 24. The base 21 includes upper and lower support plates 26 and 28 respectively which are joined together by a plurality of columnar members 30. Rotatably mounted within the base 21 is a compensator module which, in the illustrated embodiment takes the form of rod section 32. As will be apparent from the following description, this rod section 32 is an actuating member. This rod section 32 is generally cylindrical in shape with female openings on its top and bottom end sections 34 and 36 respectively. Top end section 34 is coupled with an output shaft 38 extending downwardly from the energy storage device 20. The output shaft 38 has a complimentary male end section to couple with the female end section 34 of the compensator module 32. The opposite end section 36 of the rod section 32 is coupled with a controlled shaft 40 extending out of the valve body 11, the shaft 40 having a complimentary male end section to join with end section 36 of the compensator module 32. As will be apparent to those skilled in the art, the shaft 40 extends from a tapered cylindrically shaped plug member (not shown) rotatably fitted within the correspondingly tapered portion 12 of the valve body 10. The plug member has a through passage (not shown) which is brought in and out of registry with the inlet and outlet of the valve body 11 in accordance with the angular position of the plug member relative to the valve body 11 to control flow through the valve 10. The controlled shaft 40 is intricately connected to the plug member so that rotation of the controlled shaft 40 effectuates rotation of the plug member. Depending upon the media that will be flowing through the valve 10, the valve 10 will have a preferred position (open or closed) in the event of a fire. Inasmuch as the valve 10 forms no part of the invention, per se, and only exemplary of many devices that might be controlled by the present invention, the valve 10 will be referred to as a controlled member.

Figure 5:
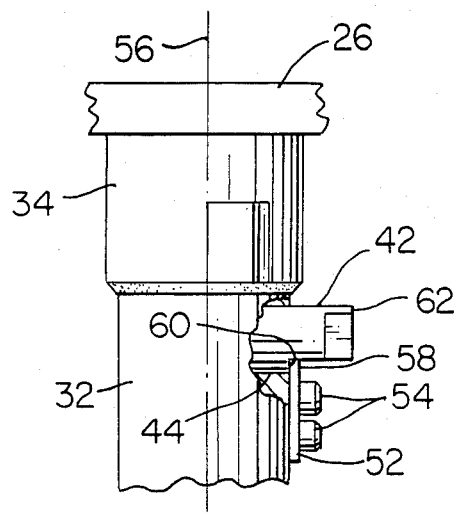
FIG. 5 is a fragmentary cutaway portion of the compensator mechanism used in the actuator of FIGS. 1-4 illustrating a spring biased latch pin and a restraining bar which limits outward radial movement of the latch pin with respect to the compensator mechanism.

Turning now to FIG. 3, compensator module 32 has a spring biased latch pin 42 which is reciprocally movable within a radially extending bore 44 of the rod section 32. This latch pin 42 is biased radially outward by a compression spring 46 fitted within the bore 44 and interposed between the inwardly disposed end 48 of the latch pin 42 and a closed end 50 of the bore 44. As best seen in FIG. 5, radially outward movement of the latch pin 42 relative to the rod section 32 is limited by a bar member 52. This bar member 52 is exteriorly secured to the rod section 32 by a pair of screws 54 which are threadably received by the rod section 32. The bar member 52 is shown extending longitudinally along the rod section 32 in a direction generally parallel to the rod section's rotational axis 56. The bar member 52 has an end section 58 which intrudes upon the latch pin's (42) range of movement by extending partially over the bore 48 to engage a shoulder 60 on the latch pin 42. The shoulder 60 is located inwardly of the latch pin's radially outermost portion 62. The intrusion of the end section 58 of the bar member 52 over the bore is necessarily limited and must permit some radial extension of the latch pin's (42) radially outermost portion 62.

A fusible link module 64 which serves as a bearing member is also secured to the base 21. The module 64 includes a holder arrangement, which in the preferred embodiment includes a cylinder 66 affixed to a support plate 30a extending between the columnar members 30. The cylinder 66 is supported by a horizontal support 66a (FIG. 2) and a connecting flange 66b, the connecting flange being held to the support plate 30a by a plurality of bolts 67. The cylinder 66 of the illustrated embodiment has a removable end cap 60a (FIG. 3) securely connected to the cylinder 66 upon its end most distal to the rod section 32. While it is desirable to have one of the end caps removable, the removable end cap may be at either end. The end of the cylinder 66 most proximal to the rod section 32 has an aperture 70 adapted to accommodate a piston rod 72 of a piston 74.

The piston 74 is adapted for reciprocal movement within the cylinder 66 but is normally restrained in this movement by a fusible material 76 disposed within the cylinder and having a melting temperature which is substantially less than the melting temperature of the rod section 32 or the other components of the actuator mechanism 18. The disposition of this fusible material 76 in the cylinder 66 positions the piston 74 in contacting relationship with the apertured end wall and positions the piston rod 72 in the rotational path of latch pin 62 as that latch pin 62 is urged counterclockwise (as viewed in FIG. 3) by the energy storage device 20 with respect to the support plate 26. Thus, as depicted in FIG. 3, when the fusible material 76 is disposed within the cylinder 66, the piston rod 72 will provide a bearing surface for latch pin 42 and the engagement of this latch pin 42 with the piston rod 72 will limit counterclockwise (as viewed in FIG. 3) movement of the rod section 32 with respect to the support plate 26.

As suggested above, the energy storage device 20 normally urges the compensator module 32 in a counterclockwise direction as viewed in FIG. 3. However, as described above, engagement of the latch pin 42 with the piston rod 72 prevents that counterclockwise movement so long as the fusible material 76 occupies the cylinder 66. The fusible material is, however, selected as one which has a melting temperature slightly below the temperature which would indicate a danger level sufficient to move the valve 10 to its fail-safe position. In the preferred embodiment, the fusible material is CERROBASE 5550-1 and is designed to melt under fire conditions. CERROBASE 5550-1 is a trademark of Cerro Metal Products, Division of Cerro Corporation of Bellefonte, Pa. As those skilled in the art will appreciate, various types of metal utectic materials may be selected. It should be apparent to those skilled in the art, however, that other materials with differing melting points could be selected for use in a wide range of applications to move a controlled member to a fail-safe position in response to some other temperature condition. It should also be apparent to those skilled in the art that FIG. 3 is depicted as looking upward into the device. Consequently, as depicted in a plan view, the rotation of the controlled device would be in a clockwise direction.

When the fusible material 76 of the preferred embodiment is exposed to a fire or other ultra-high temperature conditions sufficient to cause its melting, the pressure exerted on the fusible material by the stored energy device 20 by way of the latch pin 42 and piston rod 72, will force extrusion of the fusible material out of holes 80 provided in the cylinder 66 (see FIG. 3a). This extrusion of fusible material 76 out of the cylinder 66 will enable the piston 74 to be moved within the cylinder 66, which will, in turn, move the piston rod 72 out of the rotational path of the latch pin 42. When the piston rod 72 is so moved from the latch pin's (42) rotational path, the compensator module 32 rotates in a counterclockwise (as viewed in FIG. 3) direction under the impetus of the energy storage device 20. This rotational movement is continued until a stop bar arm 82 extending radially outward from the rod section 32 comes into engagement with an adjustable stop 84. The adjustable stop 84 is also rigidly affixed relative to the base 21. The described rotational movement of the rod section 32 is perhaps best realized from a comparison of FIGS. 3 and 4. FIG. 3 shows the illustrated actuator prior to melting of the fusible material 76 whereas FIG. 4 shows the same actuator after melting of the fusible material 76 with the compensator module 32 rotated approximately 90° from the position illustrated in FIG. 3.

FIGS. 3 and 4 also show that the rod section 32 has a radially inward extending cylindrically truncated recess 90, which in the illustrated embodiment is circumferentially disposed approximately 180° from and in radial alignment with the bore 44. This recess 90 accommodates the end of a locking latch or plunger pin 92, which locking latch 92 is spring biased against the peripheral surface of the rod section 32 toward the axis 56. The locking latch 92 is fitted within a lock block module 94 fixedly secured to the base 21. The locking latch 92 is reciprocally movable with respect to the lock block module 94 to selectively permit movement of the locking latch 92 into the recess 90 when these two elements 90 and 92 are in registry. The outwardly extending end 96 of the locking latch 94 has a truncated cylindrical configuration similar to that of the recess 90 so that the end will fit within the recess 90 when properly aligned. The locking latch 92 is radially aligned with respect to the rod section 32 and is urged toward the rotational axis 56 of that rod section 32 by a compression spring 98, the compression spring 98 being interposed between the locking latch 92 and a removable back plate 100 of the lock block module 94. This spring 98 is preferably formed of a suitable high temperature material to limit the affects of high temperature and creep. The lock block module 94 of the preferred embodiment has an aperture 102 opposite the back plate 100 and coaxial with the bore 93. This aperture 102 has a diametral dimension less than that of bore 93. The plunger 92 has a main body portion 104 and a retaining flange portion 106 with the main body portion 104 being disposed between the truncated end portion 96 and the retaining flange 106. The diameter of the main body portion 104 is slightly less than that of the diameter of the aperture 102 so as to permit reciprocal axial movement of that portion 104 in the aperture. Similarly, the diameter of the retaining flange 106 is slightly less than the diameter of bore 93 to permit reciprocal axial movement of the flange 106 within the bore 93. The diameter of the end flange 106 is, however, substantially larger than that of the aperture 102. Consequently, the flange 106 limits the axial movement of the latch pin 92 toward the radial center of rod section 32. An axial extension 92a of the plunger 92 extends radially away from the axis of rod section 32 through an aperture 100a of the back plate 100. This plunger extension 92a has a threaded end 92b distal to the retaining flange 106. A handle 99 is threadably secured on this threaded end 92b. Retaining nuts 95 and 97 are also disposed on the threaded end 92b on opposite sides of the handle 99. These retaining nuts 95 and 97 tighten against the handle 99 to prevent axial movement of that handle with respect to the plunger extension 92a. The back plate 100 is securely but removably fixed to the remainder of the lock block module through the agency of a plurality of screws 108 (FIG. 4). The removability of the back plate 100 permits easy assembly of both the latch pin 92 and the biasing spring 98 within the bore 93. The depicted actuator is arranged to bring the recess 90 into registry with the latch pin 92 whenever the stop bar arm 80 engages the adjustable stop 84. With the lock block module in its locking relationship to the rod section 32, not only is the rod section moved to a preferred fail-safe position in the event of a fire, that fail-safe position is positively locked into the mechanism.

The stop 84 includes a main body portion 110 with an internally disposed threaded bore 112. A matingly threaded stop member 114 is axially movable within the main body portion 110. Rotation of the stop member 114 with respect to the main body portion 110 allows for fine adjustability of the stop 114. This fine adjustability of the stop member 114 is important in many applications, as for example, when the controlled member must be stopped within a precise position in order to insure sealability of the controlled device. An example of a controlled device which must be stopped within a precise position is a high performance butterfly valve.

When the actuator 18 is initially moved to its normal operating position (the position depicted in FIG. 3), the compensator module 32 is moved clockwise from some position between that illustrated in FIGS. 3 and 4 to first engage an inclined surface 116 of the latch pin 42 with an interior corner 118 of the piston rod 72. This inclined surface 116 provides a lead angle, and when further clockwise rotation of the rod section 32 is effectuated, spring 46 is compressed and the latch pin 42 is moved radially inward with respect to the rod section 32. The opposite corner of the latch pin 42 includes a shoulder 120. When the corner 118 of the piston rod 72 slides into the shoulder 120 with the continued clockwise rotation of the rod section 32, the latch pin 42 is moved radially outward by the biasing force of spring 46 until the shoulder 120 comes into contacting relationship with the piston rod 72. This latter position is illustrated in FIG. 3 and represents the normal operating position of the actuator. The actuator maintains its normal operating position until subjected to fire or other ultra-high temperature conditions that will cause melting of the fusible material 76. When such melting occurs, the piston 74 is moved to a position corresponding to that depicted in FIG. 4, and the rod section 32 is freed for movement to its fail-safe position (FIG. 4), a position into which it is positively locked by locking pin 92. This positive locking of the rod section 32 prevents it from drifting away from the fail-safe position due to reverse or forward pressurization in the pipe section, thermal expansion of fluid in the pipe, or for some other reason.

Figure 6:
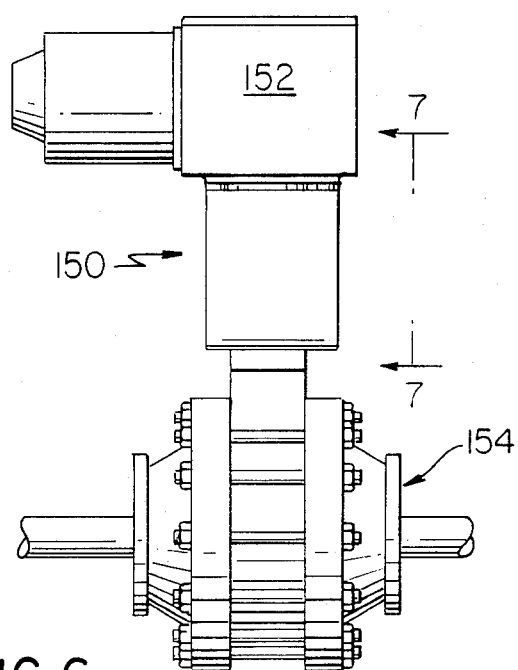
FIG. 6 is an elevational view showing a second embodiment of the actuator of the preferred invention mounted atop a butterfly valve.
Figure 7:
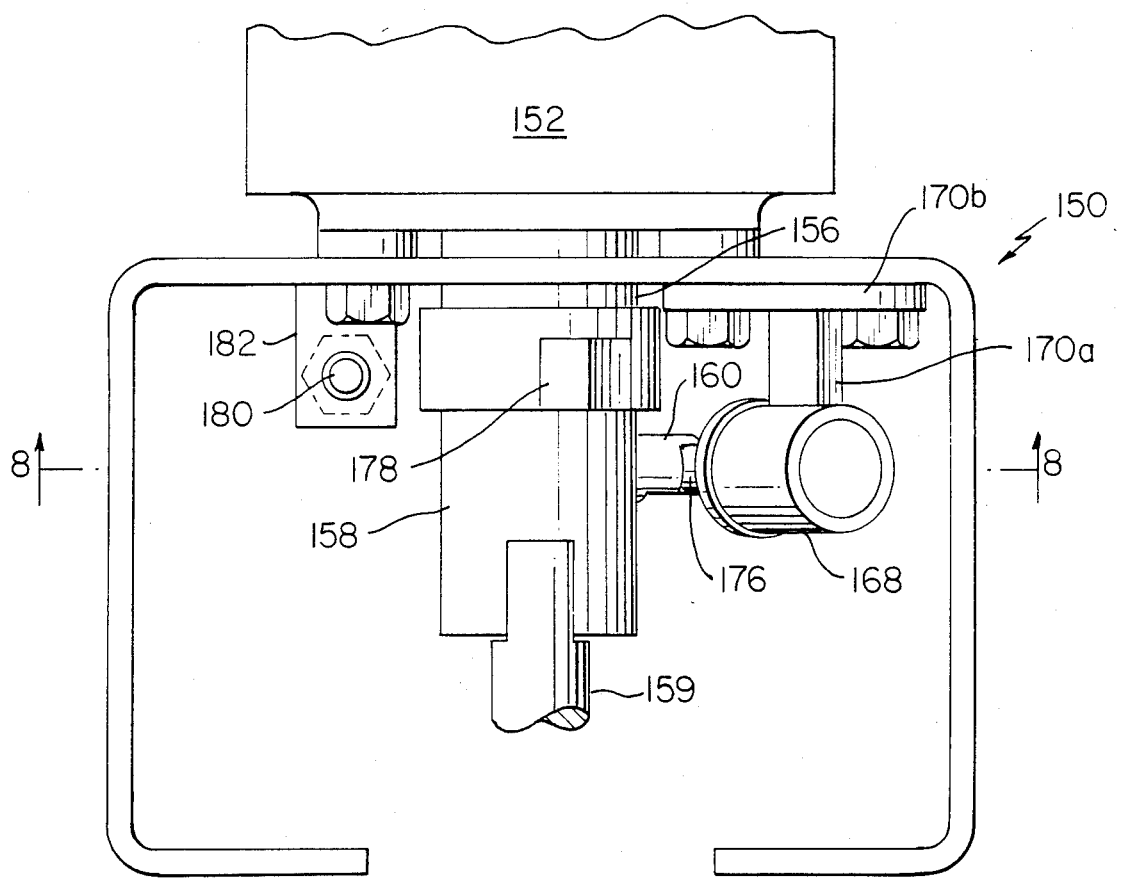
FIG. 7 is a view with parts broken away of the actuator of FIG. 6 taken in the direction of line 7—7 of FIG. 6.

Turning now to FIG. 6, another similar preferred embodiment of the invention is illustrated. This second preferred embodiment includes an actuator generally designated by the numeral 150 which is interposed between an energy storage device 152 and a controlled mechanism illustrated as a butterfly valve 154. The energy storage device 152 is a cam spring return actuator identical to the energy storage device 20 in FIG. 1. The actuator 150 is depicted in greater detail in FIG. 7 wherein it is seen that the actuator 150 includes a base 155 (FIG. 8) in the form of a rigid C-shaped metal housing member. This base 155 supports the energy storage device 152 and receives an output shaft 156 of that energy storage device 152. This output shaft 156 extends downwardly from the energy storage device 152 through an aperture (not shown) in the top of base 155. A compensator module 158 is rotatably journaled within the base 155 and has female end sections on its ends. One of the female end sections couples with a complementary male end section of the output shaft 156 while the female end section on the opposite end couples with a similar complementary male end section of a shaft 159 of the butterfly valve 154-see FIG. 7. The shaft 159 of the butterfly valve 154 is connected to a disc member (not shown), the disc member being rotated in accordance with rotation of the shaft 159 to selectively block fluid flow through the valve 154. Since butterfly valves are well known in the art and form no part, per se, of the present invention, a detailed description thereof will be omitted in the interest of brevity.

Figure 8:
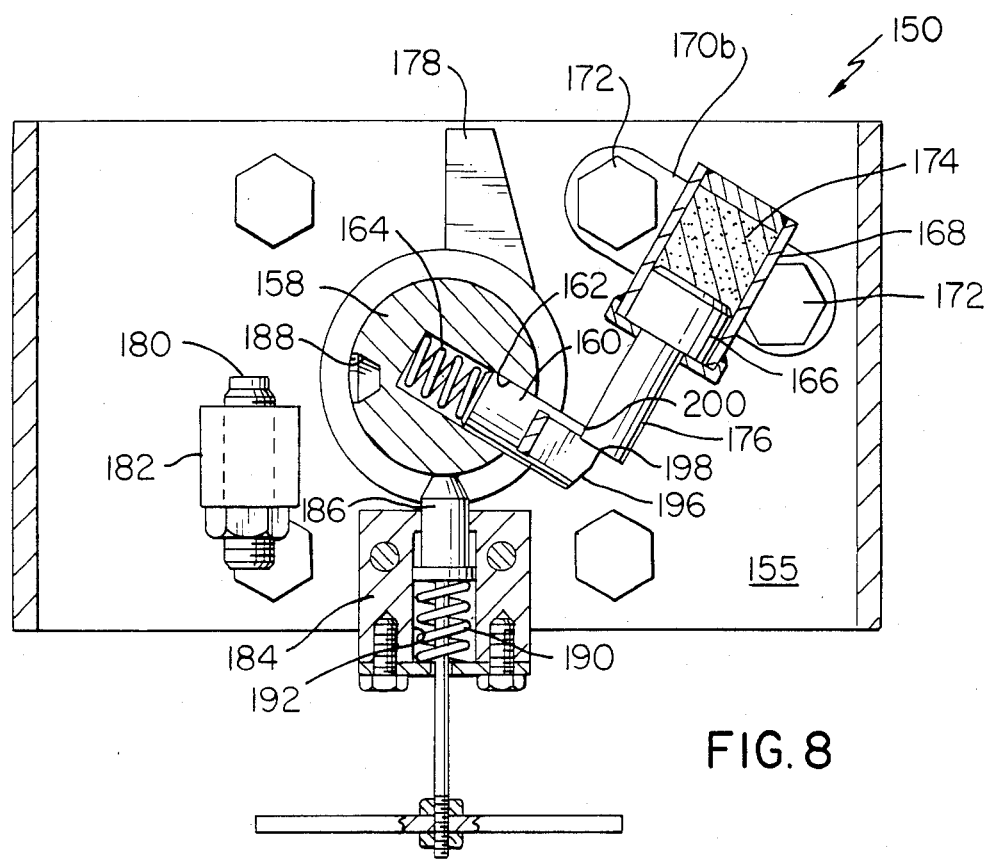
FIG. 8 is a cross sectional view of the actuator of FIGS. 6 and 7 taken along line 8—8 in FIG. 7 depicting the actuator in an energy storage position prior to melting of the fusible portion of its bearing member.
Figure 9:
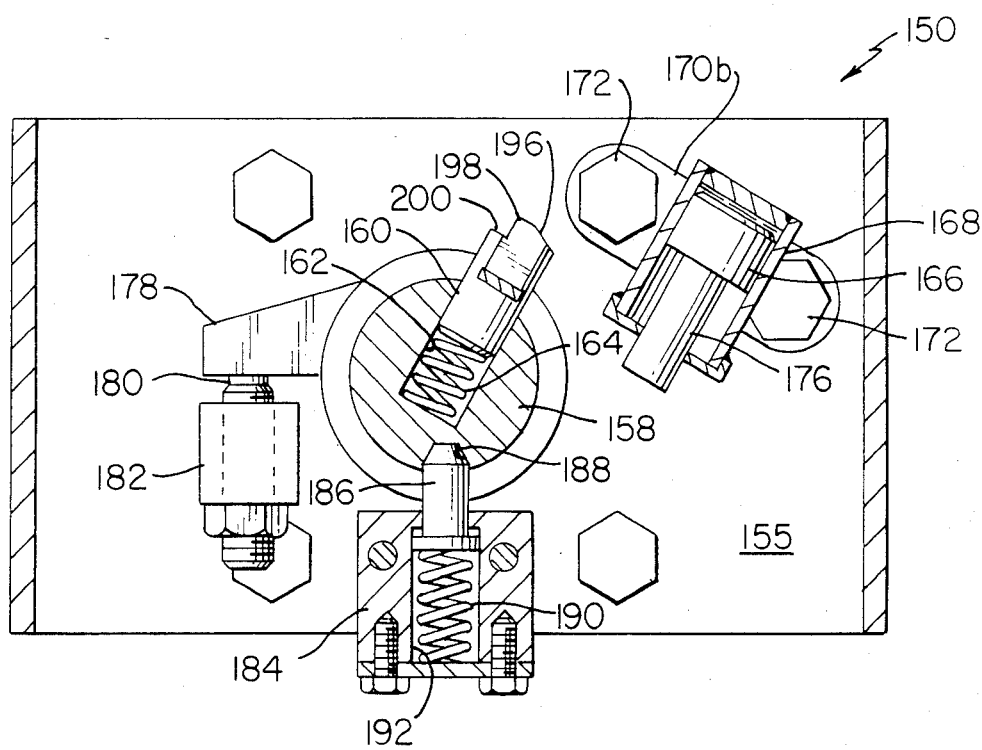
FIG. 9 is a cross sectional view of the actuator of FIGS. 6-8 also taken along line 8—8 in FIG. 7 showing the actuator in a fail-safe locked position after the fusible portion of the bearing member has melted.

The operative aspects of the second preferred embodiment are similar to that of the first embodiment and are depicted most clearly in FIGS. 8 and 9. It is seen from these drawing figures, as well as FIG. 7, that the compensator module 158, like that of the first embodiment, is a generally cylindrically shaped rod member with a spring biased latch pin 160 reciprocally movable within a closed end bore 162. The closed end bore 162 extends radially inward into the compensator module 158. The latch pin 160 is urged radially outward of the module 158 by a compression spring 164 interposed between the radially inward end of the latch pin 160 and the closed end of the bore 162.

Also secured to the base 155 is a cylinder 168 which has a reciprocally movable piston 166 disposed therein. The cylinder 168 is secured to the base 155 by having a vertically extending support 170a (FIG. 7) and a horizontally oriented connecting flange 170b. The connecting flange is secured to the top of the bore 155 by a plurality of bolts 172 (FIG. 8). A fusible material 174 fills the cylinder 168 in the FIG. 8 embodiment and precludes movement of the piston 166 into the cylinder 168 when that material 174 is below a predetermined temperature. A piston rod 176 extends from the piston 166. When the fusible material 174 fills the cylinder 168, piston rod 176 is positioned in a circumferential path of the latch pin 160. The latch pin 160 is urged into engagement with the piston rod 176 by the biasing force of the energy storage device 152.

The fusible material 174 is selected as one that will melt when subjected to fire conditions. Like the first disclosed embodiment, melting of the fusible material 174 will permit the biasing force of the energy storage device 152 to urge the piston rod 176 and piston 166 into the cylinder 168. This movement removes the piston rod 176 out of the circumferential path of the latch pin 160 and permits the compensator module 158 to rotate approximately 90° in a counterclockwise direction (as viewed from FIG. 8) until a stop arm 178, rigidly attached to the compensator module, is engaged by a movable stop 180. The movable stop 180 is a threaded member which is axially movable within a body 182. The body 182 has a threaded bore which accommodates the movable stop member 180 and permits fine axial adjustment of the stop position. The 90° rotation of the compensator module in which the stop arm 178 is engaged with the movable stop 180 is shown in FIG. 9.

A lock module 184 is also secured to the base 155 and includes a spring biased locking pin 186 which is constantly urged against the circumferential surface of the compensator module 158. As the stop arm 178 engages the stop member 180, a recess 188 in the compensator module 158 is brought into registry with the locking pin 186. The cross sectional configuration of the recess 188 is similar to that of the latch pin 186 and designed to accommodate that latch pin. A compression spring 190 disposed within a bore 192 of the lock module 184 constantly urges the locking pin 186 against the circumferential surface of the compensator module 158 and pushes that locking pin 186 into the recess 188 when the locking pin 186 and recess 188 are aligned. Such an alignment is depicted in FIG. 9 wherein the locking pin 186 extends into the recess 188 to prevent further rotational movement of that compensator mechanism.

Like the previous embodiment, the latch pin 160 has an obliquely oriented end surface 196 which provides a lead-in angle when the latch pin is initially brought into contact with the piston rod 176 for setting. As the compensator mechanism 158 is initially set, the fusible material 174 fills the cylinder 168 and the piston rod 176 will have an extension corresponding to that depicted in FIG. 8. As the compensator module 158 is rotated clockwise (as viewed in FIGS. 8 and 9), the obliquely oriented surface 196 will engage the piston rod 176 and force radial inward movement of the latch pin 160 overcoming the bias of spring 164. Once the compensator module 158 is rotated sufficiently so as to clear a shoulder 198 of the obliquely oriented surface 196, the spring 164 urges the latch pin 160 radially outward to engage a shoulder 200 of the latch pin 160 with the piston rod 176. This position is depicted in FIG. 8.

It is seen that the cylinder piston arrangement (166,168) of FIGS. 8 and 9 has different orientation to the compensator module 158 than that of the first illustrated embodiment. Many other variations on this arrangement will be apparent to those skilled in the art. Further, it will be apparent that the magnitude of rotation of the compensator module 158 may be readily modified by adjusting the position of the stop 182 and the lock module 184.

Thus it is apparent that there has been provided, in accordance with the invention, an apparatus that fully satisfies the objects, aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An apparatus for moving a controlled member to a predetermined position in response to high temperature conditions, comprising:
    (a) an energy storage device;
    (b) a movable actuating member, said actuating member being urged to a predetermined position by said energy storage device;
    (c) a bearing member, said bearing member having at least a portion formed of a fusible material with a melting temperature substantially less than the melting temperature of said actuating member, said bearing member being selectively engageable with said actuating member and operative to prevent movement of said actuating member under the urging of said energy storage device only when said fusible material is in an unmelted condition;
    (d) a stop member for limiting movement of said actuating member after movement from said bearing member after said fusible material is in a meltable condition; and
    (e) a controlled member connected to said actuating member and movable therewith, said controlled member being moved from a first position corresponding to said actuating member's engagement with said bearing member to a second position corresponding to said actuating member's engagement with said stop member;

said actuating member being selectively movable from said second position to said first position and having means that latches with said bearing member when said fusible material is in said unmelted condition and said bearing member is in its assembled condition in said apparatus and said actuating member is moved to said first position whereby said means that latches comprises latching means.

2. An apparatus as recited in claim 1 wherein said bearing member includes a piston-cylinder arrangement with the fusible material being disposed within said cylinder to limit movement of the piston within the cylinder under predetermined temperature conditions, said fusible material being meltable under certain other predetermined temperature conditions to permit movement of the piston within the cylinder.

3. An apparatus as recited in claim 2 wherein said actuating member is rotatable with respect to said bearing member.

4. An apparatus as recited in claim 3 wherein said actuating member includes a cylindrically shaped portion with a peripheral surface and said latching means is resiliently biased radially beyond said peripheral surface.

5. An apparatus as recited in claim 4 and further including a stop arm extending radially outward from said cylindrically shaped portion, said stop arm being selectively engageable with said stop member for limiting movement of said actuating member after said fusible material is in a melted condition.

6. An apparatus as recited in claim 5 wherein said stop member is adjustable to vary the limiting position for said stop arm.

7. An apparatus as recited in claim 6 and further including means for selectively locking said actuating member in the second position which corresponds to said actuating member's engagement with said stop member.

8. An apparatus as recited in claim 7 wherein said locking means includes a recess in the actuating member and a cooperating locking pin which is selectively insertable into said recess to limit rotation of said actuating member.

9. An apparatus as recited in claim 8 wherein said locking pin is spring biased against the peripheral surface of said cylindrically shaped portion so as to move into said recess when said recess and locking pin are brought into registry.

10. An apparatus as recited in claim 9 wherein said latching means includes a latch pin reciprocally movable within a bore, said bore extending radially into the cylindrical portion of said actuating member.

11. An apparatus as recited in claim 10 wherein said latch pin has a lead in angle on its end portion, the end portion being obliquely oriented with respect to said piston when said actuating member is engaged with said bearing member.

12. An apparatus as recited in claim 11 and further including a piston rod affixed to said piston, said piston rod being positioned in the rotational path of said latch pin when said fusible material is in the unmelted position and being movable out of the latch pin's rotational path after melting of the fusible material.

13. An apparatus as recited in claim 12 wherein said latch pin has a shoulder on one of its sides, said shoulder being adapted to engage said piston rod.

14. An apparatus for moving a valve to a predetermined position in response to high temperature conditions, comprising:
(a) an energy storage device;
(b) a rotatable actuating member, said actuating member being urged to a predetermined position by said energy storage device;
(c) a bearing member, said bearing member having at least a portion formed of a fusible material with a melting temperature substantially less than the melting temperature of said actuating member, said bearing member being selectively engageable with said actuating member and operative to prevent movement of said actuating member under the urging of said energy storage device only when said fusible material is in an unmelted condition;
(d) a stop member for limiting rotation of said actuating member after movement from said bearing member after said fusible material is in a meltable condition; and
(e) a valve connected to said actuating member and movable therewith, said valve being moved from a first position corresponding to said actuating member's engagement with said bearing member to a second position corresponding to said actuating member's engagement with said stop member; said actuating member being selectively movable from said second position to said first position and having means that latches with said bearing member when said fusible material is in said unmelted condition and said bearing member is in its assembled condition in said apparatus and said actuating member is moved to said first position, whereby said means that latches comprises latching means.

15. An apparatus as recited in claim 14 wherein said bearing member includes a piston cylinder arrangement with the fusible material being disposed within said cylinder to limit movement of the piston within the cylinder under predetermined temperature conditions, said fusible material being meltable under certain other predetermined temperature conditions to permit movement of the piston within the cylinder.

16. An apparatus as recited in claim 15 wherein said actuating member includes a cylindrically shaped portion with a peripheral surface and said latching means is resiliently biased radially beyond said peripheral surface.

17. An apparatus as recited in claim 16 and further including a stop arm extending radially outward from said cylindrically shaped portion, said stop arm being selectively engageable with said stop member for limiting movement of said actuating member after said fusible material is in a melted condition.

18. An apparatus as recited in claim 17 wherein said stop member is adjustable to vary the limiting position for said stop arm.

19. An apparatus as recited in claim 18 and further including means for selectively locking said actuating member in the second position which corresponds to said actuating member's engagement with said stop member.

20. An apparatus as recited in claim 19 wherein said locking means includes a recess in the actuating member and a cooperating locking pin which is selectively insertable into said recess to limit rotation of said actuating member.

21. An apparatus as recited in claim 20 wherein said locking pin is spring biased against the peripheral surface of said cylindrically shaped portion so as to move into said recess when said recess and locking pin are brought into registry.

22. An apparatus as recited in claim 21 wherein said latching means includes a latch pin reciprocally movable within a bore, said bore extending radially into the cylindrical portion of said actuating member.

23. An apparatus as recited in claim 22 wherein said latch pin has a lead in angle on its end portion, the end portion being obliquely oriented with respect to said piston when said actuating member is engaged with said bearing member.

24. An apparatus as recited in claim 23 and further including a piston rod affixed to said piston, said piston rod being positioned in the rotational path of said latch pin when said fusible material is in the unmelted position and being movable out of the latch pin's rotational path after melting of the fusible material.

25. An apparatus as recited in claim 24 wherein said latch pin has a shoulder on one of its sides, said shoulder being adapted to engage said piston rod.

* * * * *